Sept. 13, 1960

F. N. LORTIE 2,952,478

PAYROLL-FORMS COLLATOR

Filed Dec. 12, 1957

INVENTOR.
FRANCIS N. LORTIE

BY

ATTORNEY

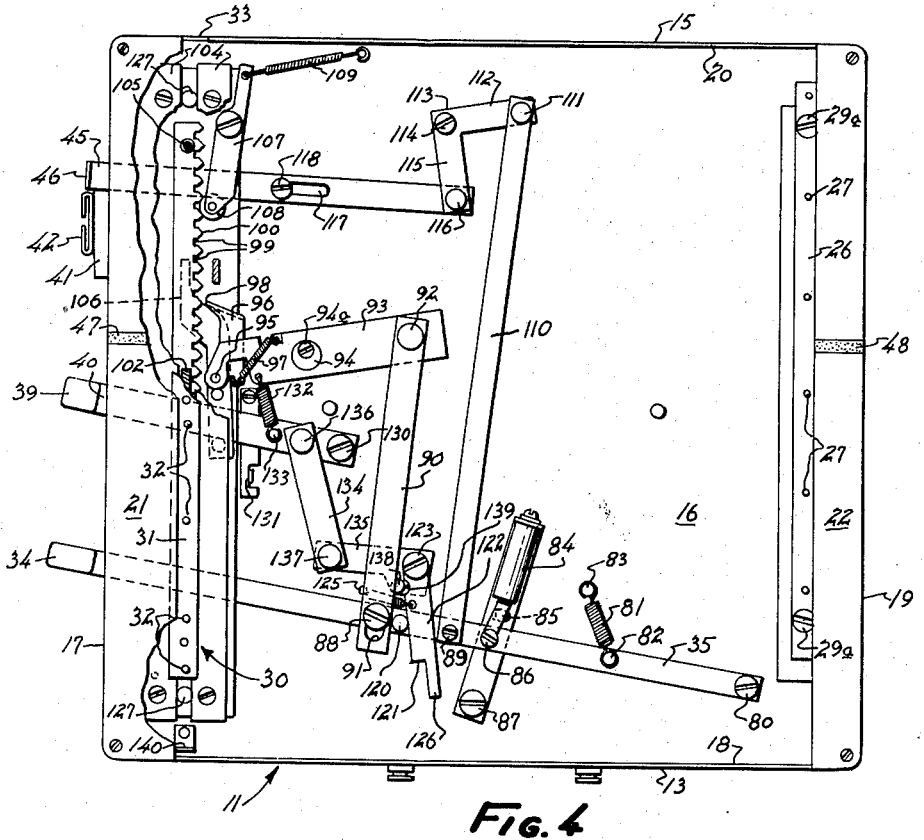

Sept. 13, 1960 F. N. LORTIE 2,952,478
PAYROLL-FORMS COLLATOR
Filed Dec. 12, 1957 3 Sheets-Sheet 3

INVENTOR.
FRANCIS N. LORTIE
BY
ATTORNEY

United States Patent Office 2,952,478
Patented Sept. 13, 1960

2,952,478
PAYROLL-FORMS COLLATOR
Francis N. Lortie, 7641 Outlook Ave., Oakland, Calif.
Filed Dec. 12, 1957, Ser. No. 702,301
11 Claims. (Cl. 282—29)

This invention relates to an improved payroll-forms collator for use by bookkeepers and accountants, to save them time and help them keep accurate records in an orderly and efficient manner.

More particularly, the present invention provides a collator especially useful for payroll work where employees' checks are mechanically pre-addressed, as by "Addressograph." In such systems, the employees' names are preferably printed on the payroll register by the mechanical addressing machine, and the individual payroll records for each employee are filed in the same order as the addressed stack of checks, so that the names of the employees are in the same serial order on all the records concerned. The individual checks and the individual employees' records may thus be placed one by one in vertical alignment with the payroll register and the data on the check posted, through carbon paper, to the register and individual record form by writing them only once, on the check. These data may include the calendar period concerned, the hours worked at regular pay, the hours at overtime pay, the earnings at the regular rate, the earning at the overtime rate, the total taxable earnings, the non-taxable earnings, the various deductions (such as pertinent taxes) called for by law, and the net earnings, which is the amount written on the check itself.

Thus, one object of the present invention is to save the bookkeeper's time on payroll work by providing a device on which the check, payroll register, and individual record can be quickly aligned for simultaneous entry of the necessary data.

Another object of this invention is to enable the use of low-priced standard payroll forms for simultaneously writing checks and posting the data to a payroll register and the individual employee's records. This is in contrast to the tendency of the prior art to evolve expensive special forms with attached, one-time carbon paper or spot carbon applied directly on the reverse side of forms—costing more than standard forms and ordinary carbon paper cost—usually with the purpose of compelling purchase of the forms from one particular manufacturer. In other words, the checks, payroll register forms, and employees' record forms utilized in the present invention may be locally printed and punched, and ordinary carbon paper may be used between the forms.

Another object of the invention is to provide a collator with a constant writing line and positive ratchet spacing of the payroll register, the principle of such spacing being similar to that used on typewriters and accounting machines. In the present invention the payroll register is shifted up a line at each entry, and each entry is made at the same position at all times. This makes it possible to provide a constant position where each check is held. By moving the payroll register up one line each time a check is written, this new collator automatically puts the proper line of the payroll register in the proper alignment beneath the next check.

Another object of the invention is to provide a collator having a constant writing line with adjustable forms-holding members, so that the payroll register, the employee's compensation record, and the payroll check may all be brought into perfect vertical and horizontal alignment even though such forms may not have been accurately printed or punched.

Another object of the invention is to provide a means for mechanically forcing each payroll check upon the aligning posts into posting position, thus relieving the bookkeeper of this time-consuming and annoying operation. This permits the use of a full sheet of carbon paper over the payroll register as the checks are forced into position without pressure being exerted through the check-carrying member downward upon sensitive carbon paper.

Another object of the invention is to provide foolproof operation of this spacing of the payroll register by forcing the bookkeeper to advance the payroll register one line each time a check is removed from the collator. Such a feature is very important, for a machine of this type should never place on the bookkeeper the burden of remembering to do the right spacing necessary to keep the records straight. The machine should automatically avoid skipping a line or writing the data from two checks on the same line, for such mistakes make it impossible for the accountant or auditor to rely on the bookkeeper's records. The collator of the present invention clamps the check in proper alignment during its writing and will not release the check until a handle is depressed to advance the payroll register up one line while opening the clamp.

Another object of the invention is to hold the check clamps open after the check is placed upon the aligning posts until the bookkeeper closes them and to insure such closure by providing clamps that force the check down over the posts into posting position. The bookkeeper can usually be relied upon to fully utilize such an automatic function.

Other objects and advantages of the invention will appear from the following description of a preferred embodiment thereof, together with some indications of its operation and uses.

In the drawings:

Fig. 3 is an enlarged view in perspective of the check-holding clamp and adjacent parts, the clamp being shown in its open positon before insertion of a check.

Fig. 4 is a top plan view taken from the same viewpoint as Fig. 1, with the forms, the check-holding clamp, and writing support plate removed and some portions of the left side plate broken away to show parts therebeneath. Both levers and their handles are shown in their upper position, which is the position shown in Fig. 1, when the check is clamped in place.

The payroll collator 10 considered externally

Figure 1:
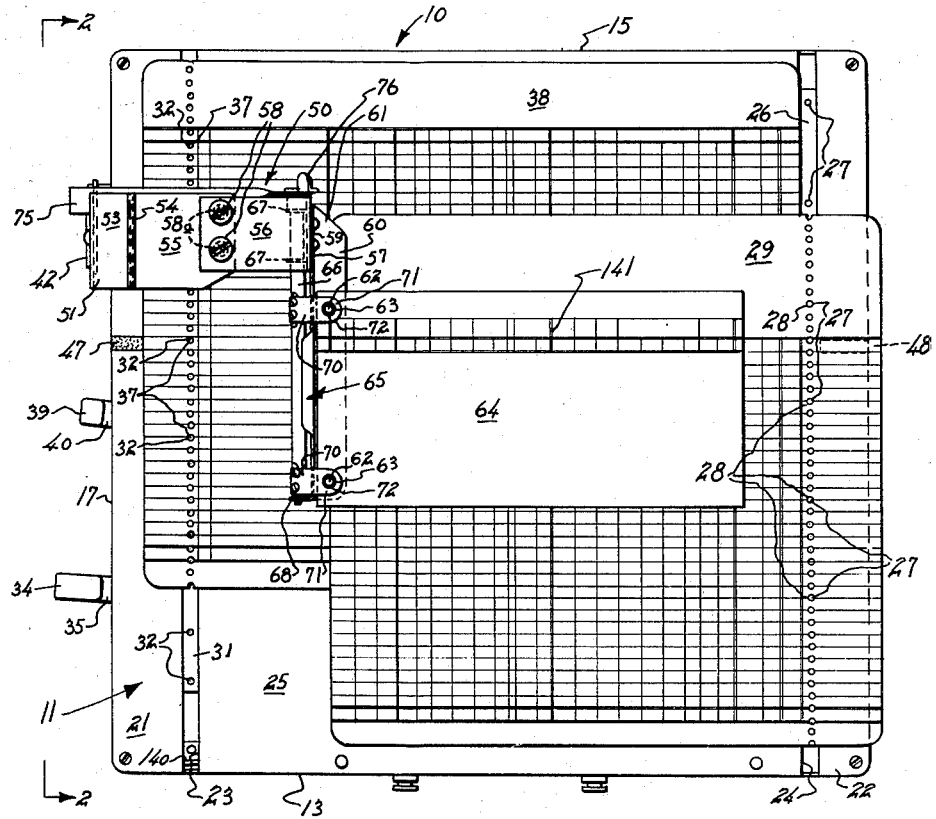
Fig. 1 is a top plan view, taken perpendicular to the board surface, of a collator embodying the principles of this invention, shown with a check, a payroll register, and an employee's record form in position thereon, with carbon paper between them, for simultaneously writing the data on the check and posting that data to the register and record.
Figure 2:
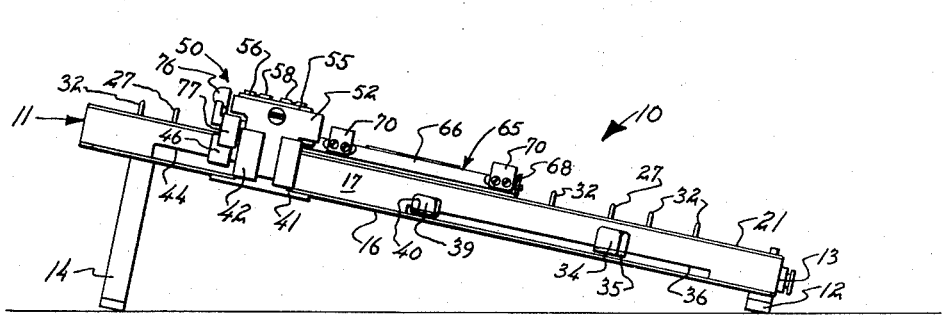
Fig. 2 is a view in side elevation taken generally along the line 2—2 in Fig. 1.
Figure 5:
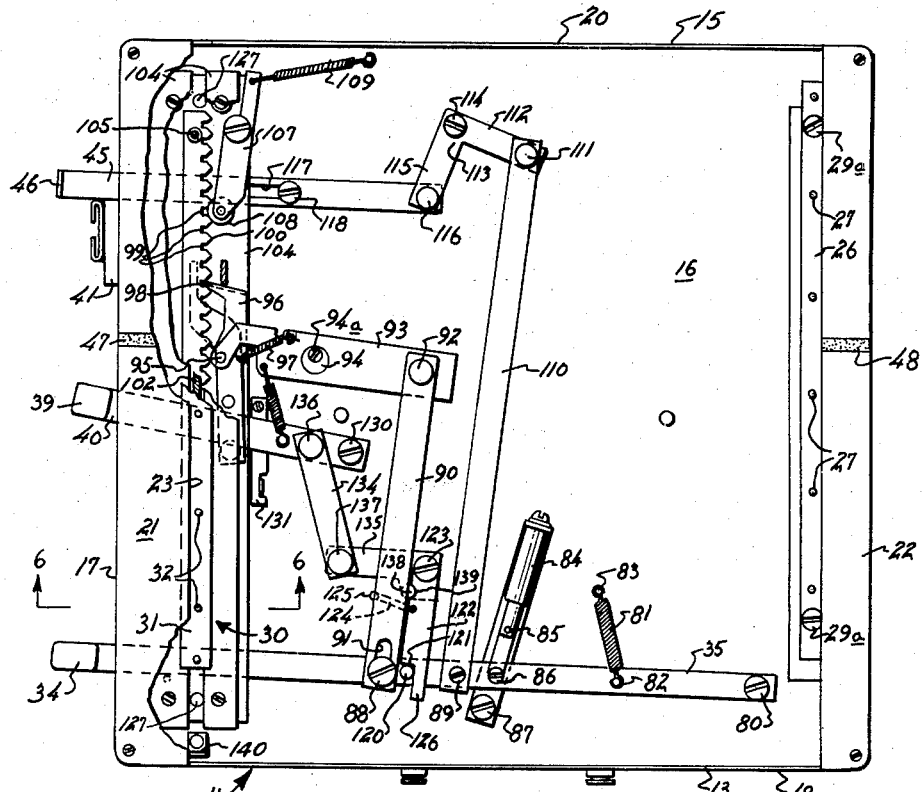
Fig. 5 is a view like Fig. 4 except that the lower lever and its handle are shown in their lower position, which is the position assumed when the check-writing clamp is open, as shown in Fig. 3, and with the carrier bar assembly of the payroll-register advancing mechanism advanced up one step.

The payroll collator 10 of my invention (see Fig. 2) comprises a box-like table or drawing-board unit 11 preferably supported by short legs 12 along its lower or front edge 13 and longer legs 14 along its rear or upper edge 15, so that the unit 11 is inclined for easy writing. However, this inclined support is not essential. The unit 11 comprises a bottom plate or base 16, four short vertical plates 17, 18, 19, and 20, a left marginal top plate 21, a right marginal top plate 22, and a main top plate 25 spaced from the two marginal top plates 21 and 22 by respective slots 23 and 24. The plates 16, 17, 18, 19, 20, 21, 22, and 25 enclose the working parts, which can be seen after the plate 25 is taken off, as shown in Figs. 4 and 5. The workings inside the unit 11 are not, of course, seen by the book-keeper and therefore a description of them will be preceded by a brief description of the exterior parts as the bookkeeper sees it, with reference to Figs. 1, 2, and 3.

In the right-hand slot 24 is a stationary bar 26 with a series of pegs 27 projecting up therefrom. The pegs 27 engage holes 28 punched in individual employee record forms 29. This bar 26, while normally stationary, can be moved vertically and horizontally (i.e., toward and away from any of the four edges of the collator), so as to bring the individual employee compensation record 29 into perfect alignment, both vertically and horizontally with the payroll register form 38. This is sometimes necessary to compensate for slight variations in printing and or punching of from 38 and or form 29. This adjustment is accomplished by having screws 29ª with oversize heads extend through oversize openings through the bar 26 and then into threaded receptacles in the base plate 16.

In the left-hand slot 23 is a movable carrier bar assembly 30, including a bar 31 with pegs 32 projecting upward therefrom. A slot 33 in the plate 20 along the upper edge 15 permits movement of the bar 31 beyond that edge. A lower handle 34 on a lower lever 35 acts, through mechanism to be described later, to move the bar 31 and its pegs 32 up one step at a time. The lever 35 projects out through a slot-like opening 36 in the plate 17. The pegs 32 engage holes 37 punched in a payroll register form 38. When the bookkeeper moves the lever handle 34 down, the form 38 is moved up one line. The lever 35 will stay down until an upper handle 39 on an upper lever 40 (which also extends out the slot 36) is depressed; then the lever 35 snaps back up.

Further up the left-hand plate 17, a bracket 41 projects out from the base plate 16. The bracket 41 has a vertically extending slide-in receptacle or socket 42. Still further up the plate 17 is an opening 44 through which projects a sliding bar 45, which has a vertically upturned end 46. The constant writing lines may be indicated by markers 47 and 48 on the surfaces of the plates 21 and 22.

A check holding clamp assembly 50 has a rigid L-shaped bracket 51 with a downwardly extending tongue 52 that engages in the receptacle 42, to hold the assembly 50 securely in place over the unit 11, substantially above the level of the top plate or table surface 25. A horizontally extending inturned portion 53 may be connected by a hinge 54 to a longer horizontal portion 55 to which an extension 56 may be bolted by screws 58. The hinge 55 is used because it makes it possible to place up to twenty-five employees' compensation ledgers at one time in posting position on the pegs 27. The hinge 55 gives the check arm assembly 50 sufficient flexibility so that the portion 56 can swing enough to permit the placement of such a group of records on pegs 27 at one time.

At its inner extremity the extension 56 is formed with a downturned flange 57, to which is secured a vertical flange 59 of an L-shaped check-support member 60. A horizontally extending portion 61 of the member 60 is adapted to lie on the top plate 25. From the portion 61 project a pair of posts 62 that are adapted to engage a pair of holes 63 punched in a check 64, the holes 63 and posts 62 being approximately the same diameter.

The screw holes 58ª in the check support member 56 that receive the screws 58 are oversize; to bring a check 64 into both horizontal and vertical alignment with the form 38, the screws 58 that attach the check support member 56 to the member 55 may be loosened, and the member 56 with its check 64 in posting position moved horizontally and vertically to achieve collation of the check 64 with the form 38. The screws 58 are then tightened.

A rotating clamping-and-releasing mechanism 65 is employed in connection with the check-support member 60 and its posts 62. The mechanism 65 comprises a shaft 66 rotatably journaled in brackets 67 that depend from the extension 56 and a bracket 68 that extends up from the support member 60. The shaft 66 lies fairly close to the check-support member 60, slightly above its horizontal portion 61, so that it can rotate without touching the top plate 25. Secured to and projecting from the shaft 66 (preferably from flattened portions thereof) are a pair of clamp members 70 with clamping feet 71 having enlarged perforations 72 to fit down over and around the posts 62, thus forcing the check 64 down into posting position on the support member 60. When the shaft 66 is rotated to the position shown in Fig. 3, the clamps 70 are lifted away from the posts 62, so that a check 64 may be inserted on or removed from the posts 62. When the shaft 66 is rotated to the position shown in Fig. 1, the clamps 70 engage the check 64 and prevent its removal, while also holding the check 64 firmly in place in the proper alignment with the other forms 29 and 38.

Rotation of the shift 66 is accomplished by lateral movement of a crank arm 75, which is pivotally mounted to a crank 76 that is rigidly secured to the shaft 66. The crank arm 75 projects out beyond the left-hand side of the board 11, generally parallel to the top surface 25, and a downturned flange 77 at its outer extremity lies outside of and is adapted to be engaged by the upturned end 46 of the sliding bar 45. The crank arm 75 is normally urged inwardly by a spring 78 under tension between it and a bracket 79 depending from the stationary portion 56 of the check-holding assembly 50. (The bracket 79 may be one of the brackets 65 which is used to journal the shaft 66, if desired.) When the flange 77 is in its position closest to the left-hand plate 17, as urged normally by the spring 78, the shaft 66 is in its clamping position, and to open the clamp, the flange 77 must be moved to the left against the pressure of the spring 78.

As the bookkeeper sees it, release of the clamp is accomplished by moving the lower handle 34 downwardly, whereupon, as he sees it, the sliding bar 45 is moved outwardly, its flange 46 engaging the flange 76 and thereby moving the crank arm 75 outwardly and swinging the shaft 66 so as to move the clamps 70 from their clamped position (Fig. 1) to their open position (Fig. 3). In other words, as the bookkeeper sees it, the depression of the handle 34 operates simultaneously to move the carrier bar assembly 30, its pegs 32, and the payroll register 38 up exactly one line, and to open the clamps 70 to permit removal of one check 64 and insertion of another check 64. At that time, the bookkeeper also removes the employee's record 29 pertaining to the completed check, thus exposing the next employee's record 29 to be posted. The clamps 70 are held open until the upper handle 39 is depressed, and then the clamps 70 spring closed in a snapping action, thus forcing the next check 64 down into posting position on the base 60.

The payroll collator 10 considered internally

Attention is now directed to Figs. 4 and 5 where the main top plate 25 has been removed to disclose the mechanism inside the unit 11. The lower lever 35 is shown pivoted to the base plate 16 by a pivot member 80 adjacent the right-hand end of the lever 35. A return spring 81 is held in tension between a post 82 on the lever 35 and a post 83 on the base plate 16. To prevent too rapid a return with attendant undesired noise, a dashpot 84 may be secured to the base plate 16. The piston for the dashpot 84 has a rod 85 pivoted to the lever 35 by a pivot pin 86. To permit limited movement of the dashpot 84, corresponding to and compensating for the lever swing, its base may be pivotally secured at 87 to the base 16.

Projecting up from the lever 35 are pivots 88 and 89, to which are secured respectively links 90 and 110. The link 90 transmits downward movement of the lever 35 to move the carrier for assembly 30 up one step at a time, while the link 110 simultaneously opens the clamps 70.

The straight link 90 is secured to its pivot 88 by a closed slot 91, and its upper end is pivotally secured by a member 92 to a lever 93. The lever 93 is fulcrumed at an eccentric bushing 94 which is tightened into place by a pin 94a so as to provide an adjusting factor for the area of movement for the lever 93. Therefore, when the lever handle 34 is depressed, the link 90 is carried down (after some lost motion) by engagement of its pin 88 in the slot 91, and the lever 93 is swung clockwise about its fulcrum 94. To a pivot 95 on the left-hand end of the lever 93 is pivoted a detent member 96. The lower end of the detent member 96 is attached to one end of a spring 97, whose other end is attached to the lever 93. The spring 97 therefore tends to swing the detent member 96 counterclockwise about its pivot 95. At the outer end of the detent member 96 a detent 98 is adapted to engage a well 99 in a ratchet 100, which has been squared to provide the detent 98 with a horizontal non-slipping surface by which it moves the carrier bar assembly 30 forward.

In its normal position, however, the detent 98 is held away from the ratchet 100 by the cam surface of a member 106, so that carrier bar assembly 30 can be returned freely to the starting position against stop member 140.

Figure 6:
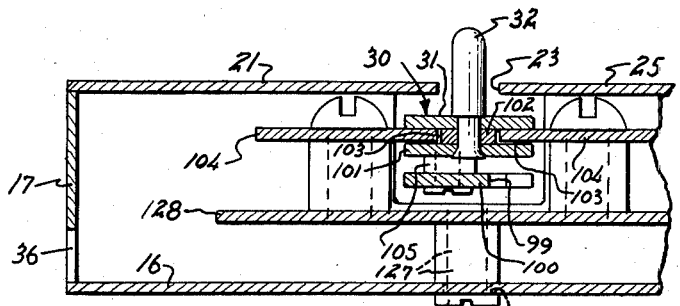
Fig. 6 is an enlarged fragmentary view in section taken along the line 6—6 in Fig. 5, with the parts behind omitted for clarity's sake, showing the carrier bar assembly and the tracks on which it moves.

As shown best in Fig. 6, the carrier bar assembly comprises the top bar 31 and a lower bar 101 spaced apart by a narrow bar 102 to provide a pair of guide slots 103. The assembly 30 is mounted slidably on a pair of parallel rails 104 that extend into the guide slots 103. The ratchet 100 is secured by bolts 105 to the bar 101; so movement of the detent 98 engages the ratchet 100 and moves the carrier bar assembly 30 up exactly one step when the handle 34 is moved to its lower position. The area of this movement is established by the eccentric bushing 94, since it is always desired that the carrier bar assembly 30 be moved forward until a roller 108 is fully seated between ratchets 100.

Also a brake arm 107, pivoted to one of the guide rails 104, carries the freely rotatable roller 108 on its inner end. A spring 109 keeps the brake in an effective position, being attached at one end to the base plate 16 and at the other to the arm 107, but the spring force is not so great that it cannot be overcome by simply sliding the ratchet 100 against it, as by grasping a peg 32 to move the carrier bar assembly 30 to the proper position.

The complete carrier bar assembly 30 preferably rests upon two hubs 127 attached to a carrier base plate 128, and the entire assembly is fastened to base plate 16 by screws 129. The holes 129a in the base plate 16 for these screws 129 are oversize, thus permitting the horizontal and vertical movement of the complete carrier bar assembly 30 in order to bring the payroll register 38 into vertical and horizontal alignment with the employee's record 29.

Downward movement of the handle 34 also carries down a link 110 which is pivoted at its lower end on the pin 89 and at its upper end by a pivot 111 to an arm 112 of a crank 113. The crank 113 is pivotally secured by a pin 114 to the base plate 16; so the crank 113 is swung clockwise as the lever handle 34 is pulled down. The other arm 115 of the crank 113 is pivoted by a pin 116 to the sliding bar 45, which is guided laterally by an elongated slot 117 that surrounds a stationary pin 118 attached to the base plate 16. Therefore, it will be seen that downward movement of the handle 34 acts through the link 110 and crank 113 to move the sliding bar 45 outwardly, and its flange 46 engages the flange 77 of the crank arm 76 to rotate the shaft 66.

When the handle 34 is moved down, the lever 35 is locked in its depressed position by a projecting stud 120 thereon engaging a latch 121 on a latch arm 122, which is mounted pivotally by a pin 123 to the base plate 16. The latch 121 is provided by a stepped portion of the arm 122, and engagement is insured by a spring 124 that is mounted in tension between the arm 122 and a stationary post 125 secured to the base plate 16. The spring 124 normally tends to move the latch arm 122 clockwise about its pivot 123, and when the stud 120 reaches the end of the latch step 121, the arm 122 is swung in, its movement being stopped by a finger portion 126. Thus the lever 35 is held in its lower position by the latch 121 after the carrier bar assembly 30 has been advanced, and the clamps 70 are held open.

The upper lever 40 is pivoted to the base 16 by a pivot member 130, its movement downwardly being stopped by a stop member 131 on the base plate 16. A return spring 132 is placed in tension between a post 133 on the upper lever 40 and the lever 93. Downward movement of the lever 40 acts to release the lever stud 120 from the latch 121 by acting through a link 134 and a crank 135. The link 134 is pivoted by a pin 136 to the upper lever arm 40 and pivoted to the crank 135 by a pin 137. The crank 135 is pivoted to the post 123 which supports the latch arm 122 and is provided with an upstanding projection 138 which engages in an arcuate notch 139 of the arm 122, when the latch arm 122 is in latched position. However, when the upper lever 40 is swung down, the link 134 causes the crank 135 to swing in and thereby its projection 138 pushes the latch arm 122 counterclockwise until the latch 121 is pushed beyond the stud 120. Then, the spring 81 exerts free pull upon the lower lever 35 to return it to its upper position carrying with it the links 90 and 91 and their corresponding parts. Upon release of the handle 39, the spring 132 pulls the lever 40 back to its upper position.

Summary of the operation

The carrier bar assembly 30 is normally moved at the start of operations to its lowest position by sliding it through the brake 107 until it engages a stop member 140 at its lower end. It is then free to move upwardly a step at a time upon each actuation of the lever 35, through the opening 33. The detent 98 is normally held away from the ratchet 100 by the member 106, permitting movement by hand of the carrier bar assembly 30. The check-holding clamp assembly 50 is put in the socket 42 so that the check support member 60 properly overlies the top plate 25, care being taken to place the flange 77 outside the upwardly projecting flange 46 of the sliding bar 45. Insurance for this proper assembly is provided in two ways: (1) the parts will normally line up correctly when both handles are in their upper position; (2) when the lower lever 35 is locked in its lower position and the check-holding assembly 50 is inserted with the flange 77 *inside* the flange 46, the device will not operate, for if the upper handle 39 is then depressed, the clamping shaft 66 will not rotate; therefore a check cannot be placed on it and the bookkeeper knows that something is wrong. All he has to do is to properly position the two flanges 77 and 46 and the device will operate.

Thus, in normal operation, with the assembly 50 in place, the bookkeeper will put the payroll register 38 in place on the peg 32, take a group of records 29, and place them on the pegs 27. Then the bookkeeper will on the first check posted depress and hold the lever 76 by its handle 76ª to manually open the clamps 70, place the check 64 (that corresponds to the record 29 and the proper line on the register 39) on the posts 62, and then release lever 76 to permit clamps 70 to force check down on posts 62. He is then ready to begin writing.

As he writes the information on the portion 141 of the check, the data are automatically posted through carbon paper to the proper location on the two forms 29 and 38 below. When he is ready to remove the check 64, he must depress the lower lever handle 34. Upon doing so, the lever 35 swings about its pivot 80 and carries down with it links 90 and 110. The link 90 swings the lever 93 inwardly to cause the detent 98 to engage a ratchet tooth and move the ratchet 100 and carrier bar assembly up one step, placing the next line on the form 38 below the portion 141 of the check 64. The link 110 swings the crank 113 to push the sliding bar 45 out. The flange 46 engages the flange 77, sliding the crank arm 76 and rotating the shaft 66 to open the clamp 70. The check 64 and the completed record 29 can then be removed and a new check 64 placed there. The next record 29 to be posted is exposed by the removal of the completed record 29. In the meantime, the lower lever 35 is locked by its stud 120 engaging the latch 121.

When the new check 64 has been placed in position, the payroll register 38 has already been advanced one step, so all the bookkeeper needs to do then is to depress the upper handle 40. This acts through the link 134 and the crank 135 to cause the pin 138 to engage the arm 122 and swing it counterclockwise, releasing the stud 120 from the latch step 121, whereupon the spring 81 acts to bring the lower lever 35 up to its upper position, at the same time acting through links 90 and 110, to bring the lever arm 93 to its lower position, with its ratchet-engaging detent 98 retracted, and to restore the sliding bar 45 to its retracted position while, upon release of the upper handle 39, the spring 132 restores the upper lever 40 to its upper position. The spring 78 acts to swing the shaft 66 and engage the clamps 70 against the check 64; so the bookkeeper may now fill out the next check, posting it simultaneously.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A posting collator, comprising a base member, a table surface supported by said base member and divided by a slot, said base member having a vertical socket projecting up from beyond one side edge of said table surface, a paper carrier bar assembly mounted in said slot for movement therealong, said assembly having projections adapted to engage perforations in a piece of paper so as to carry it therewith, a check-holding member supported by said base member and having a releasable clamp, said check-holding member comprising a stationary L-shaped bracket with a vertical portion fitting in said socket, and a horizontal portion overlying said table surface and spaced thereabove, and, at the end opposite said vertical portion, a depending portion with a horizontal flange providing a check-support member adapted to rest on said table with posts projecting up therefrom and comprising part of said clamp, a rotatable shaft supported by said check-holding member parallel to said check-support member, clamp members comprising the other part of said clamp supported by said shaft for rotation into engagement with said posts and out of engagement therewith, a crank on said shaft, an arm pivotally mounted to said crank for sliding movement relative to said table surface, spring means normally urging said clamp members to their closed position, and a sliding member, first lever means for simultaneously moving said assembly in said slot one step at a time and opening said clamp, and second lever means for closing said clamp, said sliding member being actuated by said first lever means to engage said arm and open said clamp, said sliding member being returned by said second lever means, whereupon said spring closes said clamp.

2. The collator of claim 1 wherein the horizontal portion of said bracket is made in a plurality of pieces, with one portion hinged to another portion for limited swinging movement.

3. The collator of claim 1 wherein the horizontal portion of said bracket is made in a plurality of pieces, with one portion having oversize holes and another portion screws with oversize heads to obtain adjustment of the alignment thereof.

4. A posting collator, comprising a base member; a table supported by said base member; a paper carrier bar assembly mounted for sliding movement along said table and having means for engaging a piece of paper so as to carry it therewith; a check-holding member supported by said base member and having a horizontal portion overlying said table surface with posts projecting up therefrom, a rotatable shaft parallel to said horizontal portion check-support member, clamp members supported by said shaft for rotation into and out of engagement with said posts, a crank on said shaft, an arm pivotally mounted to said crank for sliding movement relative to said table surface, and spring means normally urging said clamp members to their closed position; first lever means for simultaneously moving said assembly in said slot one step at a time and opening said clamp, and second lever means for closing said clamp; a sliding member actuated by said first lever means to engage said arm and rotate said clamp members out of engagement with said posts, said sliding member being returned to an inactive position by actuation of said second lever means, whereupon said spring closes said clamp members into engagement with said posts.

5. A posting collator comprising a frame; a table surface supported on said frame and split by a slot adjacent and parallel to one edge and having a plurality of peg openings parallel to said slot near the opposite edge; a carrier bar assembly mounted for longitudinal movement along said slot and having a rack on one edge below said table and a plurality of upwardly projecting paper-aligning pegs on its upper surface; lever means fulcrumed to said frame beneath said table and having handle means extending out beyond said table; rack-moving means operatively connected to said lever means and engageable with said rack upon movement of said lever means, for one-step-at-a-time movement of said rack; a stationary bracket with a portion anchored to said frame, a horizontal portion overlying said table surface and spaced thereabove, and a depending portion from said horizontal portion with a horizontal flange providing a check-support member adapted to rest on said table surface with posts projecting up therefrom; a rotatable shaft supported by said bracket parallel to said flange; clamp members supported by said shaft for rotation into a closed position in engagement with said posts and an open position out of engagement therewith; a crank on said shaft; an arm pivotally mounted to said crank for sliding movement relative to said table surface; spring means normally urging said clamp members to their closed position; and a sliding member actuated by said lever means to engage said arm and open said clamp; and means for returning said lever and said sliding member to the position where said clamp is closed by said spring.

6. A posting collator comprising a frame; a table surface supported on said frame and split by a slot adjacent and parallel to one edge and having a plurality of peg openings parallel to said slot near the opposite edge; a carrier bar assembly mounted for longitudinal movement along said slot and having a rack on one edge below said table and a plurality of upwardly projecting paper aligning pegs on its upper surface; lever means fulcrumed to said frame beneath said table and having handle means extending out beyond said table; rack-moving means operatively connected to said lever means and engageable with said rack upon movement of said lever means, for one-step-at-a-time movement of said rack; a stationary L-shaped bracket with a vertical portion anchored to said frame and a horizontal portion overlying said table surface and spaced thereabove and having a depending portion with a horizontal flange providing a check-support member adapted to rest on said table surface with posts projecting up therefrom; a rotatable shaft supported by said bracket parallel to said flange; clamp members supported by said shaft for rotation into a closed position in engagement with said posts and an open position out of engagement therewith; a crank on said shaft; an arm pivotally mounted to said crank for sliding movement relative to said table surface; spring means normally urging said clamp members to their closed position; and a sliding member actuated by said lever means to engage said arm and open said clamp; means to lock said lever means in its clamp-open position; spring means urging said lever means to its clamp-closed position; and release means for unlocking the lock means.

7. A posting collator comprising a frame; a table surface supported on said frame and split by a slot adjacent and parallel to one edge and having a plurality of peg openings parallel to said slot near the opposite edge; a carrier bar assembly mounted for longitudinal movement along said slot and having a rack on one edge below said table and a plurality of upwardly projecting paper aligning pegs on its upper surface; lever means fulcrumed beneath said table and having handle means extending out beyond said table; rack-moving means operatively connected to said lever means and engageable with said rack upon movement of said lever means, for one-step-at-a-time movement of said rack; return means for said rack-moving means and said lever means; a first bar mounted for sliding movement transverse to said rack below said table surface and operatively connected to said lever means; a second bar mounted for sliding movement transverse to said rack above said table surface; a lost-motion connection between said two bars so that when said lever means is moved, said bars are moved; a check-support member supported by said frame on said table surface with posts projecting up therefrom; a rotatable shaft supported by said check-holding member parallel to said check-support member and having clamp members moved by rotation of said shaft in one direction into clamping engagement with said posts and, by rotation of said shaft in the other direction, out of engagement therewith; a crank on said shaft, said second bar being pivotally mounted to said crank; and spring means normally urging said clamp members into clamping engagement, save when said sliding bars are moved by said lever means.

8. A posting collator comprising a frame; a table surface supported on said frame and having top, bottom, and left and right side edges, said surface being split by a slot adjacent and parallel to the left side edge and having near and parallel to the right side edge a series of upstanding pegs, said surface also having a line indicator near each side edge parallel to said top edge; a carrier bar assembly mounted in frame-supported guideways for longitudinal movement along said slot and having a rack on one edge below said table and a plurality of paper aligning pegs projecting up from its upper surface; first and second levers separately fulcrumed to said frame beneath said table and having handles extending out beyond the left side edge of said table; a link operatively connected to said first lever for movement approximately parallel to the left side edge of the table when the handle of said first lever is moved toward said bottom edge; a third lever pivoted to said frame and pivotally connected at one end to said link and having a rachet member pivoted to its other end for engagement with said rack upon movement of said first lever, for one-step-at-a-time movement of said rack in one direction; brake means for limiting the movement of said rack; return springs for said first lever; a second link operatively connected to said first lever; a crank pivoted at one end to said frame and pivotally connected to said second link; a sliding bar mounted generally parallel to said top edge for sliding movement relative to said frame and pivoted to the other end of said crank; a second sliding bar slidably mounted above said frame for engagement by and movement with the first-named said sliding bar; a shaft rotatably mounted to said frame above said table surface and having an upper clamp member with perforations; a lower clamp member having posts thereon that project through or are withdrawn through said perforations by rotation of said shaft; latching means for holding said first lever locked in its lower position; means actuated by said second lever for releasing said latch; and spring means for pulling said first lever to its upper position upon release of said latch.

9. A posting collator, comprising a base member; a table surface supported by said base member and divided by a slot; a paper carrier bar assembly mounted in said slot for movement therealong, said assembly having projections adapted to engage perforations in a piece of paper so as to carry it therewith; a check-holding member supported by said base member and comprising a stationary bracket with a horizontal portion overlying said table surface with posts projecting up therefrom, a rotatable shaft parallel to said horizontal portion, clamp members supported by said shaft, an arm pivotally mounted to said shaft and slidable relative to said table surface, and means normally urging said clamp members to their closed position; first lever means pivotally supported by said base member for movement between an inactive upper position and a lower position for simultaneously moving said assembly in said slot one step at a time and opening said clamp members; latch means holding said first lever means in said lower position; second lever means for returning said lever to its upper position; and means actuated by said first lever means to move said arm and open said clamp members, said means being inactivated by said second lever means.

10. A posting collator, comprising a base member, a table surface supported by said base member and divided by a slot, a paper carrier bar assembly mounted in said slot for movement therealong, said assembly having projections adapted to engage perforations in a piece of paper so as to carry it therewith, a check-holding member supported by said base member and having a releasable clamp, first lever means for simultaneously moving said assembly in said slot one step at a time and opening said clamp when moved forward, latch means holding said first lever means in its forward position where said clamp is open so that a check can be taken out of said check-holding member and a new one put in without having to hold the clamp open, said latch means also holding said first lever means against retraction and thereby preventing additional advance of said assembly, and second lever means for releasing said latch means and returning said first lever means to the position where said clamp is closed and where further advance becomes possible.

11. A posting collator, comprising a base member, a table surface supported by said base member and divided by a slot, a paper carrier bar assembly mounted in said slot for movement therealong, said assembly having projections adapted to engage perforations in a piece of paper so as to carry it therewith, a check-holding member supported by said base member and having a releasable clamp, first lever means pivotally supported by said base member for movement between an inactive upper position and a lower position for simultaneously moving said assembly in said slot one step at a time and opening said clamp, latch means holding said first lever means in said lower position, so that said clamp is held open and so that said assembly cannot be additionally advanced, and second lever means for returning said lever to its upper position where said clamp is closed and said first lever means can once again be moved to its lower position when desired.

References Cited in the file of this patent

UNITED STATES PATENTS

| | | |
|---|---|---|
| 2,344,453 | Payne | Mar. 14, 1944 |
| 2,494,142 | Pfeiffer et al. | Jan. 10, 1950 |
| 2,589,884 | Solway | Mar. 18, 1952 |
| 2,623,762 | Nelson | Dec. 30, 1952 |
| 2,640,715 | Lontz | June 2, 1953 |

FOREIGN PATENTS

| | | |
|---|---|---|
| 571,620 | Great Britain | Aug. 31, 1945 |
| 641,851 | Great Britain | Aug. 23, 1950 |